| United States Patent [19] | [11] Patent Number: 4,904,728 |
|---|---|
| George | [45] Date of Patent: Feb. 27, 1990 |

[54] POLYMER BLENDS

[75] Inventor: Eric R. George, Houston, Tex.

[73] Assignee: Shell Oil Company, Houston, Tex.

[21] Appl. No.: 239,094

[22] Filed: Aug. 31, 1988

[51] Int. Cl.[4] .................. C08L 23/08; C08L 51/04; C08L 53/02

[52] U.S. Cl. .................. 525/64; 525/71; 525/93; 525/98; 525/185

[58] Field of Search .......... 525/64, 95, 185, 98, 525/93, 71

[56] References Cited

U.S. PATENT DOCUMENTS

| | | | |
|---|---|---|---|
| 2,495,286 | 1/1950 | Brubaker | 260/63 |
| 3,251,905 | 5/1966 | Zelinkski | 260/879 |
| 3,390,207 | 6/1968 | Moss et al. | 260/879 |
| 3,598,887 | 8/1971 | Darcy et al. | 260/879 |
| 3,780,140 | 12/1973 | Hammer | 260/884 |
| 3,964,412 | 9/1972 | Nozaki | 260/63 |
| 4,157,428 | 6/1979 | Hammer | 521/134 |
| 4,219,627 | 8/1980 | Halasa et al. | 525/89 |
| 4,226,952 | 10/1980 | Halasa et al. | 525/192 |
| 4,292,414 | 9/1981 | Saito et al. | 525/255 |
| 4,351,931 | 9/1982 | Armitage | 526/227 |
| 4,427,828 | 1/1984 | Hergenrother et al. | 525/66 |
| 4,578,429 | 3/1986 | Gergen et al. | 525/291 |
| 4,600,614 | 7/1986 | Lancaster et al. | 428/35 |
| 4,601,948 | 7/1986 | Lancaster et al. | 428/349 |
| 4,657,970 | 4/1987 | Shiraki et al. | 525/57 |
| 4,659,970 | 4/1987 | Melocik | 318/269 |
| 4,659,971 | 4/1987 | Melocik | 318/269 |
| 4,670,173 | 6/1987 | Hayashi et al. | 252/51.5 A |
| 4,761,449 | 8/1988 | Lutz | 524/427 |
| 4,761,453 | 8/1988 | Allen | 524/612 |
| 4,775,708 | 10/1988 | Smutny et al. | 524/108 |

FOREIGN PATENT DOCUMENTS

| | | |
|---|---|---|
| 121965 | 10/1984 | European Pat. Off. . |
| 181014 | 5/1986 | European Pat. Off. . |
| 213671 | 3/1987 | European Pat. Off. . |
| 222454 | 5/1987 | European Pat. Off. . |
| 229408 | 7/1987 | European Pat. Off. . |
| 9174-622A | 3/1983 | Japan . |
| 1081304 | 8/1967 | United Kingdom . |
| 86/07010 | 12/1986 | World Int. Prop. O. . |

Primary Examiner—Allan M. Lieberman
Attorney, Agent, or Firm—Dean F. Vance

[57] ABSTRACT

Non-miscible polymeric blends comprising a major proportion of a linear alternating polymer of carbon monoxide and at least one ethylenically unsaturated hydrocarbon and lesser amounts of a maleated, partially hydrogenated block copolymer and an alpha-olefin/alpha,beta-ethylenically unsaturated copolymer exhibit improved melt stability and improved toughness and impact strength.

12 Claims, No Drawings

POLYMER BLENDS

FIELD OF THE INVENTION

This invention relates to an improved polymer blend comprising predominantly a linear alternating polymer of carbon monoxide and at least one ethylenically unsaturated hydrocarbon. More particularly, the invention relates to ternary blends comprising a major proportion of the linear alternating polymer and lesser proportions of an alpha-olefin/unsaturated carboxylic acid polymer and a maleated, partially hydrogenated block copolymer.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. U.K. Pat. No. 1,081,304 produced similar materials of higher carbon monoxide content in the presence of alkylphosphine complexes of palladium salts as catalyst. Nozaki extended the process to prepare linear alternating polymers in the presence of arylphosphine complexes of palladium moieties and certain inert solvents. See, for example, U.S. Pat. No. 3,964,412.

More recently, the class of linear alternating polymers has become of greater interest in part because of the greater availability of the polymers in quantity. These polymers, often referred to as polyketones or polyketone polymers, have been shown to be of the repeating formula —CO—(Z)— wherein Z is a moiety of ethylenically unsaturated hydrocarbon polymerized through the ethylenic unsaturation. By way of further example, when the unsaturated hydrocarbon is ethylene, the polyketone polymer will be of the repeating formula —CO—(CH$_2$—CH$_2$)—. The general process for the more recent preparation of such polymers is illustrated by a number of Published European Patent Applications including Nos. 121,965 and 181,014. The process typically involves a catalyst composition formed from a salt of a Group VIII metal selected from palladium, cobalt or nickel, the anion of a strong non-hydrohalogenic acid and a bidentate ligand of phosphorus, arsenic or antimony.

The resulting polyketone polymers are relatively high molecular weight thermoplastics having established utility in the production of shaped articles such as containers for the food and drink industry and internal and external parts for the automotive industry, which articles are produced by conventional techniques such as injection molding or extrusion. For some particular application it has been found to be desirable to have properties for a polymeric composition which are somewhat different from those of the polyketone polymers. It would be of advantage to retain the more desirable properties of the polyketone polymers and yet improve other properties. These advantages are often obtained through the provision of a polymer blend.

SUMMARY OF THE INVENTION

The present invention contemplates the provision of blends of a linear alternating polymer of carbon monoxide and at least one ethylenically unsaturated hydrocarbon with other polymeric materials. More particularly, there are provided, according to the invention, ternary blends comprising a major proportion of the linear alternating polymer and lesser amounts of a maleated, partially hydrogenated block copolymer and an alpha-olefin/unsaturated carboxylic acid polymer. Such blends exhibit improved toughness and impact resistance.

DESCRIPTION OF THE INVENTION

The polyketone polymers which are employed as the major component of the blends of the invention are linear alternating polymers of carbon monoxide and at least one ethylenically unsaturated hydrocarbon. Suitable ethylenically unsaturated hydrocarbons for use as precursors of the polyketone polymers have up to 20 carbon atoms inclusive, preferably up to 10 carbon atoms inclusive, and are aliphatic such as ethylene and other alpha-olefins including propylene, butylene, isobutylene, 1-hexene, 1-octene and 1-dodecene, or are arylaliphatic containing an aromatic substituent on an otherwise aliphatic molecule, particularly an aromatic substituent on a carbon atom of the ethylenic unsaturation. Illustrative of this latter class of ethylenically unsaturated hydrocarbons are styrene, p-methylstyrene, m-propylstyrene and p-ethylstyrene. Preferred polyketone polymers are copolymers of carbon monoxide and ethylene or terpolymers of carbon monoxide, ethylene and a second hydrocarbon of at least 3 carbon atoms, particularly an alpha-olefin such as propylene.

The structure of the polyketone polymers is that of a linear alternating polymer of carbon monoxide and hydrocarbon(s) and there will be substantially one molecule of carbon monoxide for each molecule of hydrocarbon. When terpolymers of carbon monoxide, ethylene and a second hydrocarbon are employed as a component in the blends of the invention, there will be at least two units incorporating a moiety of ethylene for each unit incorporating a moiety of the second hydrocarbon. Preferably there will be from about 10 to about 100 units incorporating a moiety of ethylene for each unit incorporating a moiety of the second hydrocarbon. The polymer chain is therefore represented by the repeating formula

$$-CO-(CH_2-CH_2)]_x[CO-(G)]_y$$

wherein G is the moiety of the second ethylenically unsaturated hydrocarbon polymerized through the ethylenic unsaturation. The —CO—(CH$_2$—CH$_2$)— units and the —CO—(G)— units are found randomly throughout the polymer chain and the ratio of y:x is no more than about 0.5. In the modification of the invention where copolymer of carbon monoxide and ethylene is employed as the blend component, there will be no second hydrocarbon present and the polyketone polymer is represented by the above formula wherein y is 0. When y is other than 0, i.e., terpolymers are employed, ratios of y:x from about 0.01 to about 0.1 are preferred. The end groups or "caps" of the polymer chain will depend on what materials are present during the preparation of the polymer and whether and how the polymer has been purified. The precise properties of the polymer will not depend to any considerable extent upon the end groups so that the polymer is fairly represented by the above formula for the polymer chain.

Of particular interest are the polyketone polymers of number average molecular weight from about 1,000 to about 200,000, particularly those polyketone polymers of number average molecular weight from about 20,000 to about 90,000, as determined by gel permeation chromatography (GPC). The physical properties of such polymers will depend in part upon the molecular weight of the polymer, whether the polymer is a copolymer or a terpolymer and, in the case of terpolymers, the proportion of the second hydrocarbon present. Typical melting points of the polymers are from about 175° C. to about 300° C., more frequently from about 210° C. to about 270° C. The polymers have a limiting viscosity number (LVN) measured in a standard capillary viscosity measuring device in m-cresol at 60° C., of from about 0.4 to about 10, preferably from about 0.5 to about 4. Polyketone polymers having an LVN of from about 1.4 to about 2.3 are particularly preferred.

A method of preparing the polymers which is now becoming conventional is to contact the carbon monoxide and hydrocarbon(s) in the presence of a catalyst composition formed from a palladium compound, the anion of a non-hydrohalogenic acid having a pKa below about 6, preferably below about 2, and a bidentate ligand of phosphorus. The scope of the process for polyketone preparation is extensive but, without wishing to be limited, a preferred palladium compound is a palladium carboxylate, particularly palladium acetate, the preferred anion is the anion of trifluoroacetic acid or p-toluenesulfonic acid and the preferred bidentate phosphorus ligand is 1,3-bis(diphenylphosphino)propane or 1,3-bis[di(2-methoxyphenyl)phosphino]propane. Such a process for polyketone production is illustrated by copending U.S. patent application Ser. No. 930,468, filed Nov. 14, 1986.

Polymerization is conducted in a gas phase in the substantial absence of reaction diluent or in a liquid phase in the presence of a reaction diluent such as an alkanol, e.g., methanol or ethanol. The reactants are contacted under polymerization conditions in the presence of the catalyst composition by conventional methods such as shaking or stirring in a suitable reaction vessel. Typical reaction temperatures are from about 20° C. to about 150° C., more often from about 50° C. to about 135° C. Suitable reaction pressures are from about 1 bar to about 200 bar, preferably from about 10 bar to about 100 bar. Subsequent to reaction, the polymer is recovered by conventional techniques such as filtration or decantation. The polymer product may contain residues of the catalyst composition which are removed, if desired, by treatment of the polymer product with a solvent or a complexing agent which is selective for the residues.

The second component of the ternary blends of the invention is a modified block copolymer which has been partially hydrogenated and further modified by the grafting of a maleic acid compound onto the block copolymer structure. The term "block copolymer" is used to indicate a thermoplastic elastomer characterized by at least one block of at least predominantly polymerized vinyl aromatic hydrocarbon (A block) and at least one aliphatic block of at least predominantly polymerized conjugated alkadiene (B block).

The vinyl aromatic hydrocarbon useful as the precursor of A blocks has a vinyl group, i.e., a

group, attached directly to an aromatic ring and has up to 12 carbon atoms inclusive. Preferred vinyl aromatic hydrocarbons are styrene and styrene homologs such as those of the formula

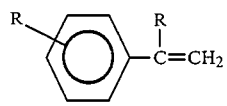

wherein R independently is hydrogen or alkyl of up to 4 carbon atoms inclusive. Illustrative of such compounds are styrene, alpha-methylstyrene, alpha-ethylstyrene, p-methylstyrene, p-ethylstyrene, m-propylstyrene and alpha,4-dimethylstyrene. Styrene and alpha-methylstyrene constitute a preferred class of vinyl aromatic hydrocarbons and particularly preferred is styrene.

The A blocks of the block copolymer independently are at least predominantly the polymerized vinyl aromatic hydrocarbon and preferably are homopolymeric blocks. Alternatively, however, one or more A blocks are blocks wherein some of the monomer of the B block is copolymerized with the predominant vinyl aromatic hydrocarbon monomer of block A. Such blocks are termed tapered and have at least about 85% by mol and preferably at least 93% by mol of the polymerized vinyl aromatic hydrocarbon with any remainder being the conjugated alkadiene of block B. A block containing a mixture of vinyl aromatic hydrocarbons are also suitable but are less preferred. The average molecular weight of an A block is typically from about 5,000 to about 125,000 while A blocks of an average molecular weight from about 7,000 to about 125,000 are preferred.

Each B block independently is at least predominantly polymerized conjugated alkadiene. The alkadienes useful as the monomer for a B block are conjugated alkadienes of up to 8 carbon atoms inclusive such as those conjugated dienes of the formula

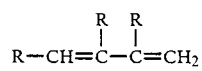

wherein R has the previously stated significance. Illustrative of such alkadienes are butadiene, isoprene, 2,3-dimethylbutadiene, 1,3-octadiene, 1,3-pentadiene and 2-methyl-1,3-hexadiene. Preferred conjugated alkadienes are butadiene and isoprene and butadiene is particularly preferred. Each B block is at least predominantly polymerized alkadiene with the B block being at least about 85% mol and preferably at least about 93% mol of polymerized alkadiene with any remainder being the vinyl aromatic hydrocarbon of the A blocks in the case of a tapered block. Homopolymeric blocks as each B block are preferred although tapered blocks and blocks of polymerized mixed alkadienes are also satisfactory. Within a polymerized alkadiene block two modes of polymerization are possible and are generally observed. In what is termed a 1,4 polymerization, each carbon atom of the four-carbon alkadiene moiety is incorporated within the polymer chain which then includes two carbon atoms joined by an ethylenic linkage. In what is termed 1,2 polymerization, the polymerization involves only one carbon-carbon double bond of the conjugated alkadiene. The carbon atoms of that bond will be incorporated into the polymer chain which will then contain a pendant unsaturated group. Control of the two modes of polymerization is within the skill of the art. Preferred block copolymers are those wherein from about 25% to about 55% of the units of each B block are the result of 1,2-polymerization. The average molecular weight of a B block is suitably from about 10,000 to about 300,000, preferably from about 30,000 to about 150,000.

Within the block copolymer, A block will total from about 2% by weight to about 55% by weight based on total block copolymer. Contents of A block from about 10% by weight to about 30% by weight, same basis, are preferred. The total molecular weight of the block copolymer will average from abut 25,000 to about 350,000, preferably from about 35,000 to about 300,000. These average molecular weights are determined by conventional techniques such as tritium counting methods or osmotic pressure measurements.

The structure of the block copolymer will depend upon the method of polymerization employed to produce the block copolymer. In one modification, the block copolymer is termed linear and is produced by sequential polymerization of the blocks. By way of example in producing a three-block or triblock polymer, the vinyl aromatic hydrocarbon of the A block is polymerized through the use of an initiator, preferably an alkyl lithium compound. The conjugated alkadiene of block B is then introduced and subsequently the vinyl hydrocarbon required for the second A block. Such a block copolymer is characterized as ABA. A two-block or diblock polymer is produced by polymerizing an A block using a lithium initiator and subsequently introducing the conjugated alkadiene of the second block. Such a polymer would be characterized as AB. Substantially complete polymerization of the monomer of each block prior to introducing the monomer of the next block will result in the formation of homopolymeric blocks. If, prior to the complete polymerization of any one block, the monomer of the next block is introduced a tapered block will result. Similar sequential polymerization techniques are employed to produce block copolymers characterized as ABABA, ABAB, ABABABA, or even polymers of a higher number of blocks. Production of block copolymers, particularly those of a relatively high number of blocks, is also accomplished through the use of a coupling agent to couple or connect growing polymer chains. Use of a difunctional coupling agent such as dihaloalkane will result in the production of linear polymers but use of a coupling agent having a functionality of three or more, e.g., silicon tetrahalide or dialkyl esters of dicarboxylic acids, will result in the formation of polymers which are termed radial or branched, respectively.

These block copolymers are well known in the art and the characterization and production of such polymers are illustrated by U.S. Pat. No. 3,251,905, U.S. Pat. No. 3,390,207, U.S. Pat. No. 3,598,887 and U.S. Pat. No. 4,219,627.

The block copolymers useful as precursors of the blend component of the invention are preferably linear polymers of the following types: polystyrene-polybutadiene (SB), polystyrene-polyisoprene (SI), polystyrene-polybutadiene-polystyrene (SBS), polystyrene-polyisoprene-polybutadiene (SIS), poly(alpha-methylstyrene-polybutadiene-poly(alpha-methylstyrene), poly(alpha-methylstyrene)-polyisoprene-poly(alpha-methylstyrene). Block copolymers of the SBS type are particularly preferred. These block copolymers are now conventional and a number are commercially available and marketed by Shell Chemical Company as KRATON ® Thermoplastic Rubber.

To produce the blend component of the invention, the block copolymers are partially hydrogenated and then modified further by reaction with a maleic acid compound. The hydrogenation of block copolymers is also well known in the art and includes catalytic hydrogenation in the presence of Raney nickel or elemental noble metal in finely divided form, e.g., finely divided platinum or palladium. Such hydrogenation typically results in the hydrogenation of most if not all of the unsaturation of the aromatic unsaturation in the A blocks as well as the ethylenic unsaturation of aliphatic B block. In the production of the components of the blends of the invention, a partial hydrogenation is employed which serves to hydrogenate most of the unsaturation of each aliphatic B block while not hydrogenating the unsaturation of the aromatic rings of A blocks to any substantial extent. The process of hydrogenation is illustrated by the disclosures of U.S. Pat. No. 3,113,986 and U.S. Pat. No. 4,226,952. Suitable partially hydrogenated block copolymers are those wherein no more than 25% and preferably no more than 5% of the aromatic unsaturation has been hydrogenated and in the hydrogenated polymerized conjugated alkadiene block the residual unsaturation is from about 0.5% to about 20% of the unsaturation after hydrogenation.

The partially hydrogenated block copolymer is often identified by the structure of the block copolymer precursor and the "apparent" structure of the aliphatic block(s). Thus, partial hydrogenation of an SBS block polymer will result in a polymer having a hydrogenated mid-block which is apparently polyethylene in the case of a mid-block produced by 1,4-polymerization and ethylene/butylene copolymer in the case of a mid-block unit produced with a portion of 1,2-polymerization and a portion of 1,4-polymerization. These are indicated by SES and SEBS respectively. A corresponding diblock polymer would be termed SE or SEB. The polymer produced by partial hydrogenation of a SIS block copolymer of a high degree of 1,4-structure in the mid-block is termed, upon hydrogenation, a SEPS polymer because of the similarity of the mid-block to an ethylene/propylene copolymer. The maleated, partially hydrogenated block copolymers, preferred as components of the blends of the invention, are preferably made from partially hydrogenated block polymers of the SEBS type wherein the hydrogenated butadiene units of the mid-block are from about 45% to about 65% of the ethylene type (1,4 addition) and the remainder being of the butylene type (1,2 addition). The partially hydrogenated block copolymers of these types are also well known in the art with a number being commercial. For example, certain of the partially hydrogenated block copolymers are marketed by Shell Chemical Company as KRATON ® G Thermoplastic Rubber.

The maleated, partially hydrogenated block copolymer employed as a component in the blends of the invention is an adduct of the partially hydrogenated block copolymer and a maleic acid compound. The maleated polymers are illustratively produced by the addition of a hydrogen atom located on a carbon atom allylic to residual unsaturation of the partially hydrogenated block copolymer to the carbon-carbon double bond of the maleic acid compound together with the formation of a carbon-carbon bond between the maleic acid compound and the polymer chain of the partially hydrogenated block copolymer. By way of illustration, but without wishing to be bound by any particular reaction theory, the production of maleated block copolymer takes place according to the reaction scheme which follows, wherein the wavy lines represent the continuing polymer chain

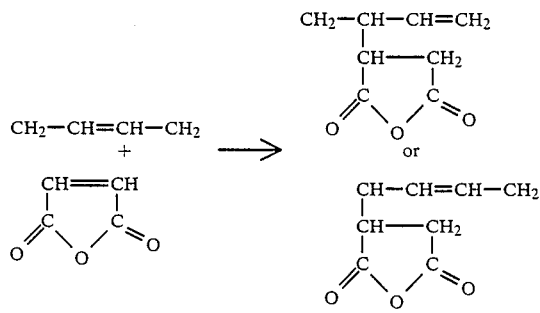

Maleic acid compounds which are suitably employed in the production of the maleated, partially hydrogenated block copolymers include maleic acid, maleic anhydride, mono-alkylesters of maleic acid wherein the alkyl is lower alkyl of up to 4 carbon atoms inclusive, the mono-amide of maleic acid and maleic imide. Of the maleic acid compounds, the use of maleic anhydride is preferred.

The maleated, partially hydrogenated block copolymers are known in the art as is the method of their production. In general, the process for the production of the maleated product is a graft process wherein the maleic acid compound is grafted onto the aliphatic portion of the partially hydrogenated block copolymer chain. In one modification, the partially hydrogenated block copolymer and the maleic acid compound are contacted in the presence of a free radical initiator which is preferably a peroxy compound. Contacting customarily takes place at a temperature sufficient to melt the reactants and to decompose the initiator, for example a temperature from about 75° C. to about 450° C., more often from about 200° C. to about 300° C. Such reactions are often conducted without a solvent or reaction diluent and often in an extruder which serves to melt and mix the reactants and to heat the mixture to the desired elevated temperature. In alternate modifications, the partially hydrogenated block copolymer and the maleic acid compound are contacted in solution in a suitable solvent in the absence of a free radical initiator at an elevated temperature on the order of from about 150° C. to about 200° C. Often, free radical inhibitors are added in these latter modifications to inhibit gelling.

The extent of the maleation of the partially hydrogenated block copolymer is dependent in part on the extent of residual unsaturation of the polymer aliphatic block(s). In terms of the polymers as described above, sufficient maleic acid compound is reacted with the partially hydrogenated block copolymer to produce a maleated derivative containing from about 0.02% by weight to about 20% by weight, based on total polymer, of the moiety derived from the maleic acid compound grafted onto the aliphatic portion of the partially hydrogenated block copolymer. Preferably the maleated product will contain from about 0.1% by weight to about 10% by weight of the maleic acid moiety on the same basis, and most preferably from about 0.2% by weight to about 5% by weight of the maleic acid compound moiety.

In general, the solvent-free "extruder-type" maleation process is preferred. Disclosures of such processes, now conventional, are found in U.S. Pat. No. 4,292,414, U.S. Pat. No. 4,427,828, U.S. Pat. No. 4,628,072, U.S. Pat. No. 4,657,970 and U.S. Pat. No. 4,657,971. Other processes are disclosed in U.S. Pat. No. 4,578,429 and U.S. Pat. No. 4,670,173.

Certain of the maleated, partially hydrogenated block copolymers are commercial and some are marketed by Shell Chemical Company as KRATON G Thermoplastic Rubber. A particularly preferred maleated, partially hydrogenated block copolymer is marketed as KRATON G 1901X Thermoplastic Rubber and is characterized as a maleated block copolymer of the SEBS type with a styrene content of 28% by weight, a specific gravity of 0.91 and a maleic acid functionality, as grafted maleic anhydride, of 2% by weight.

The blends of the invention comprise a major proportion of the linear alternating polymer of carbon monoxide and at least one ethylenically unsaturated hydrocarbon and lesser proportions the maleated, partially hydrogenated block copolymer and an alpha-olefin/unsaturated carboxylic acid polymer. The olefin/unsaturated carboxylic acid polymer is a polymer of an alpha-olefin and an alpha, beta-ethylenically unsaturated carboxylic acid, with an optional small amount of a third monomer.

The alpha-olefin component of the olefin/unsaturated polymer is an alpha-olefin of up to 10 carbon atoms inclusive such as ethylene, propylene, 1-hexene, isobutylene, 1-octene or 1-decene. Preferred alpha-olefins are straight chain alpha-olefins of up to 4 carbon atoms inclusive and particularly preferred is ethylene. The alpha-olefin component of the olefin/unsaturated acid polymer is present in at least about 80% by mol, based on total polymer, and is preferably present in a quantity of at least about 90% by mol on the same basis.

The unsaturated carboxylic acid component of the olefin/unsaturated acid polymer is preferably an alpha,-beta-ethylenically unsaturated carboxylic acid of up to 10 carbon atoms inclusive and is illustrated by acrylic acid, methacrylic acid, 2-hexenoic acid, 2-octenioc acid and 2-decenoic acid. The preferred alpha,beta-ethylenically unsaturated carboxylic acids have up to 4 carbon atoms inclusive. These are acrylic acid, methacrylic acid and crotonic acid, of which acrylic acid and methacrylic acid are preferred. The unsaturated acid component of the olefin/unsaturated acid polymer is from about 1% by mole to about 20% by mol based on total polymer. Amounts of unsaturated carboxylic acid from about 10% by mol to about 20% by mol on the same basis are preferred.

The olefin/unsaturated acid polymer is suitably a copolymer of the alpha-olefin and the alpha,beta-ethylenically unsaturated carboxylic acid and in general such copolymers are preferred. On occasion, however, it is useful to include as an optional component, a third monomer which is a non-acidic low molecular weight polymerizable monomer of up to 8 carbon atoms inclusive. Such optional third components may be other olefins, particularly other alpha-olefins such as propylene and styrene when the major alpha-olefin component is ethylene, unsaturated esters such as vinyl acetate or methyl methacrylate, unsaturated halohydrocarbons such as vinyl chloride and vinyl fluoride, and unsaturated nitriles such as acrylonitrile. The presence of a third polymerizable monomer is, as previously stated, optional and no third component is required. When a third component is present, however, amounts of third polymerizable monomer up to about 5% by mol, based on total olefin/unsaturated acid polymer, are satisfactory with amounts up to about 3% on the same basis being preferred.

The blends of the invention comprise a major amount of the linear alternating polymer of carbon monoxide and at least one ethylenically unsaturated hydrocarbon with lesser amounts of the maleated, partially hydrogenated block copolymer and the olefin/unsaturated acid polymer. Amounts of the maleated, partially hydrogenated block copolymer from about 0.5% by weight to about 10% by weight, based on total blend are satisfactory with amounts from about 2% by weight to about 7% by weight, same basis, being preferred. The alpha-olefin/alpha,beta-ethylenically unsaturated carboxylic acid polymer is present in an amount of from about 0.1% by weight to about 4% by weight, based on total blend. Amounts from about 0.5% by weight to about 3% by weight on the same basis are preferred.

The method of producing the blends of the invention is not material so long as a relatively uniform distribution of the maleated, partially hydrogenated block copolymer and the olefin/unsaturated acid polymer throughout the polyketone is obtained. The blend is a non-miscible blend with the minor components existing as a discrete phase in the polyketone matrix. it appears that the olefin/unsaturated acid polymer is found as a shell/core type inclusion within a discrete maleated, partially hydrogenated block copolymer phase where the discontinuous phase size is from about 0.1 micron to about 0.8 micron, preferably from about 0.3 micron to about 0.5 micron. The blend will not, therefore, be homogeneous but good results are obtained when the distribution of the minor components throughout the polyketone is substantially uniform. The method of producing the blend is that which is conventional for non-miscible polymeric materials. In one modification, the blend components in particulate form are mixed and passed through an extruder operating at high RPM to produce the blend as an extrudate. In an alternate modification, the components are blended in a mixing device which exhibits high shear.

The blends of the invention may also include conventional additives such as antioxidants, stabilizers, fillers, fire retardant materials, mold release agents and other substances which are added to improve the processability of the components or to modify the properties of the resulting blend. Such additives are added by conventional methods prior to, together with or subsequent to the blending of the components.

The blends of the invention are characterized by improved toughness and impact resistance. The blends are of particular utility where the articles produced from the blends of the invention are likely to be subjected to impact. The blends are processed by conventional techniques such as injection molding or extrusion into sheets, films, plates or shaped articles. The formed polymer articles find utility in the packaging industry, in the production of containers as for food or drink and in the production of external and internal parts for automotive applications.

The invention is further illustrated by the following Examples which should not be regarded as limiting.

COMPARATIVE EXAMPLE I

A linear alternating terpolymer (87/032) was prepared employing a catalyst composition formed from palladium acetate, the anion of trifluoroacetic acid and 1,3-bis[di(2-methoxyphenyl)phosphino]propane. The terpolymer had a melting point of 220° C. and a limiting viscosity number, measured at 60° C. in m-cresol, of 1.96.

EXAMPLE II

Blends were prepared of the linear alternating terpolymer of Comparative Example I with (a) (Comparative) 5% by weight, based on total blend, of KRATON 1901X, a maleated, partially hydrogenated block copolymer of the SES/SEBS type having 28% by weight styrene and 2% by weight of maleic anhydride grafted to the midblock of the block copolymer, (b) (Comparative) 1% by weight, based on total blend, of ethylene/acrylic acid copolymer of 89% ethylene and 11% acrylic acid, having a melting point of 95° C., marketed by Dow as PRIMACOR ® 1410, and (c) 5% by weight of the polymer of (a) and 1% of the polymer of (b), based on total polymer.

The blends were prepared by dry mixing pellets of the terpolymer and the added component(s). The tumbled mixture was melt blended in a 30 mm corotating twin screw extruder having seven zones and a total of L/D of 27/1. The melt temperature of the die exit was 260° C. and the zone temperatures along the barrel were maintained at 466° C. All blends were devolatized under vacuum (40 in Hg) at the zone adjacent to the die.

Samples for testing were injection molded on an Engel (8 oz) injection molder equipped with a 2.2/1 compression ratio screw. The cycle time for all samples was about 30 seconds. Standard test specimens were molded in a family mold and samples were immediately placed in a dry box. All properties are for dry as molded specimens.

A sample of terpolymer plus each of (a), (b), and (c) was tested for impact resistance according to ASTM D-256. The results of this testing are shown in the Table which follows.

TABLE

| Sample Content | Notched Izod (ft lbs/in) |
| --- | --- |
| terpolymer | 4 |
| terpolymer + (a) | 19 |
| terpolymer + (b) | 7 |
| terpolymer + (c) | 20 |

What is claimed is:

1. A composition comprising a non-miscible uniform blend of, as a matrix and as a major component, a linear alternating polymer of carbon monoxide and at least one ethylenically unsaturated hydrocarbon having up to 20 carbon atoms and, dispersed therein, (a) about 0.5% by weight to about 10% by weight, based on total composition, of a maleated, partially hydrogenated block copolymer, said block copolymer having at least one at least predominantly polymerized vinyl aromatic compound block and at least one at least predominantly aliphatic polymerized conjugated alkadiene block, said maleated, partially hydrogenated block copolymer containing residual aliphatic block unsaturation from about 0.5% to about 20% of the unsaturation of the aliphatic blocks of said block copolymer, and from about 0.02% by weight to about 20% by weight, based on total block copolymer, of moieties of maleic acid compound grafted to the polymer aliphatic blocks, and
(b) about 0.1 by weight to about 4% by weight, based on total composition of a polymer of an alpha-olefin and an alpha,beta-ethylenically unsaturated carboxylic acid.

2. The composition of claim 1 wherein the linear alternating polymer is represented by the repeating formula $$-CO-(CH_2-CH_2)]_x[CO-(G)]_y$$

wherein G is the moiety of ethylenically unsaturated hydrocarbon of at least 3 carbon atoms polymerized through the ethylenic unsaturation and the ratio of y:x is no more than about 0.5.

3. The composition of claim 2 wherein the maleated partially hydrogenated block copolymer is maleated block copolymer derived from a block copolymer precursor wherein
(i) each A block independently is a block of at least predominantly polymerized vinyl aromatic compound selected from styrene and alpha-methylstyrene, the average molecular weight of each A block being from about 5,000 to about 125,000,
(ii) each B block independently is a block of at least predominantly polymerized alkadiene selected from butadiene and isoprene, the average molecular weight of each B block being from about 10,000 to about 300,000, and
(iii) the A blocks being from about 2% by weight to about 55% by weight of the total block copolymer.

4. The composition of claim 3 wherein the polymer of olefin and unsaturated acid is a polymer of at least 80% alpha-olefin of up to 10 carbon atoms inclusive, from 1% by mol to about 20% by mol, based on total polymer of an alpha,beta-ethylenically unsaturated carboxylic acid of up to 10 carbon atoms inclusive, and up to 5% by mol, based on total polymer of a non-acidic, low molecular weight polymerizable monomer.

5. The composition of claim 4 wherein y is 0.

6. The composition of claim 4 wherein G is a moiety of propylene.

7. The composition of claim 6 wherein the ratio of y:x is from about 0.01 to about 0.1.

8. The composition of claim 6 wherein the alpha-olefin is ethylene and the unsaturated carboxylic acid is acrylic acid or methacrylic acid.

9. The composition of claim 8 wherein the vinyl aromatic compound is styrene and the alkadiene is butadiene.

10. The composition of claim 9 wherein the polymer of alpha-olefin and unsaturated carboxylic acid is a copolymer of at least about 93% by weight ethylene and from about 3% by weight to about 7% by weight based on total polymer of acrylic acid.

11. The composition of claim 10 wherein the maleated, partially hydrogenated block copolymer is from about 2% by weight to about 7% by weight of the total blend.

12. The composition of claim 11 wherein the ratio of y:x is from about 0.01 to about 0.1.

* * * * *